L. E. EASTER.
WIRELESS CORN PLANTER.
APPLICATION FILED JAN. 7, 1913.
1,153,426.
Patented Sept. 14, 1915.
4 SHEETS—SHEET 2.
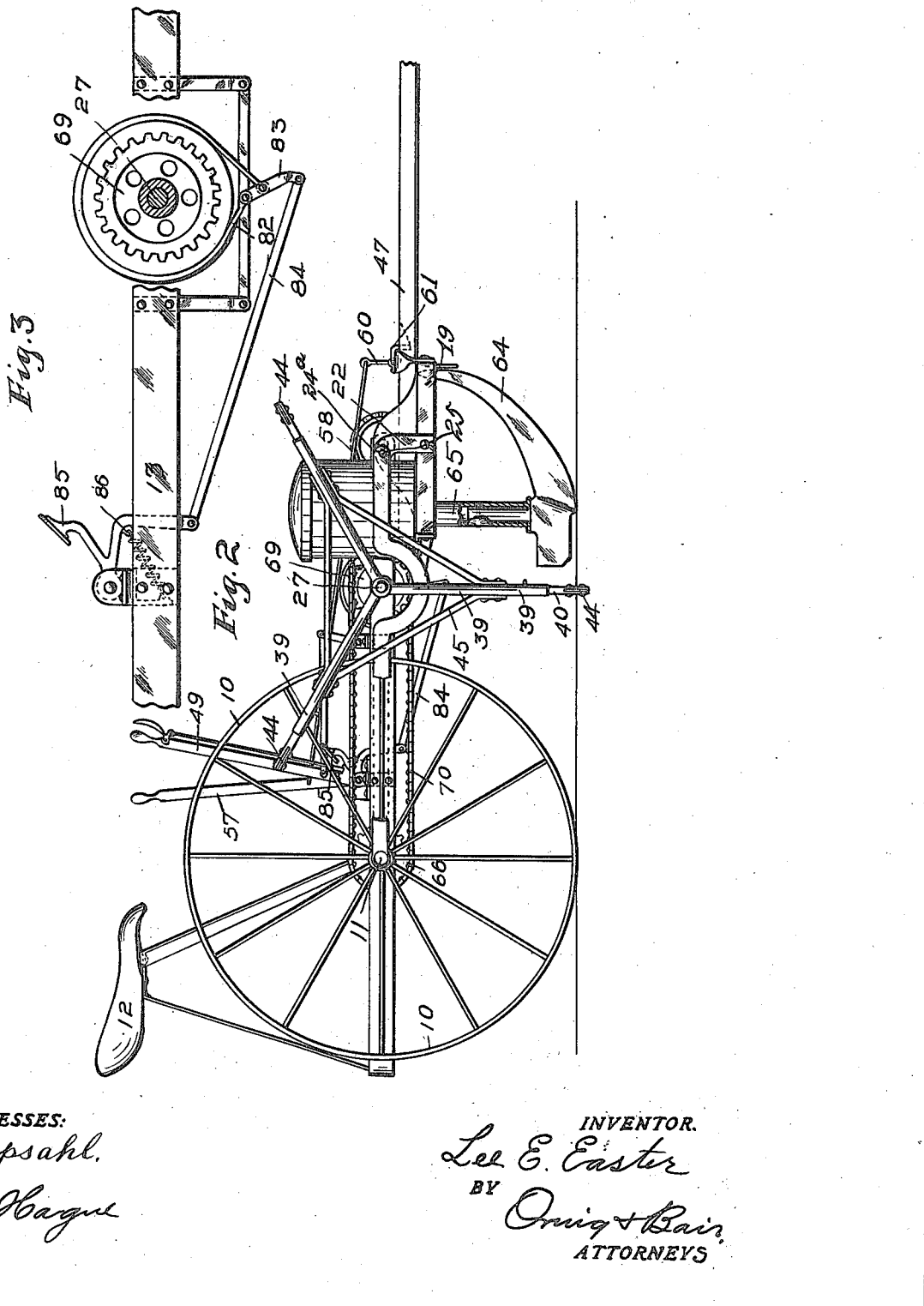
WITNESSES:
H. L. Opsahl.
A. G. Hague.
INVENTOR.
Lee E. Easter
BY
Orwig & Bair
ATTORNEYS

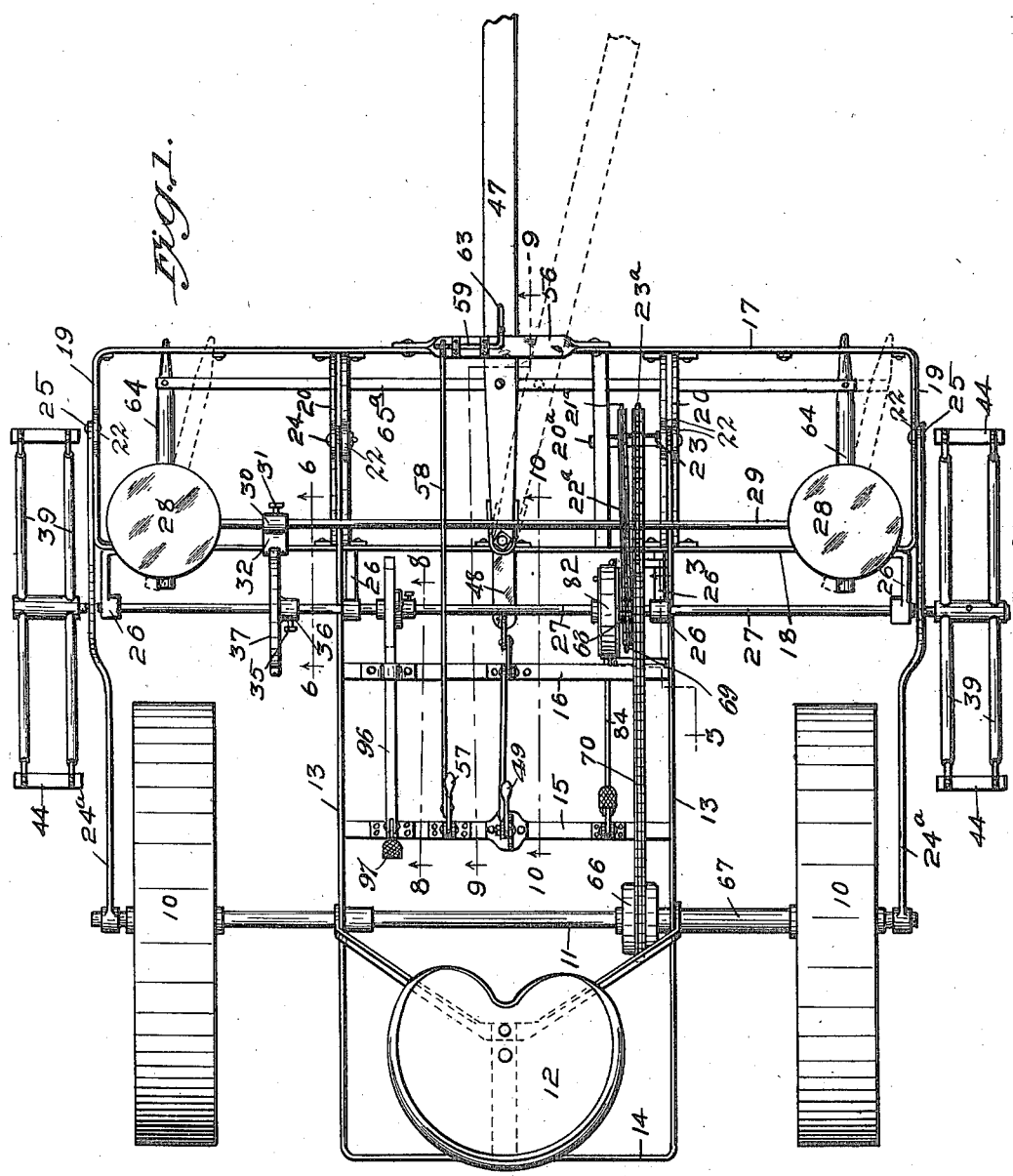

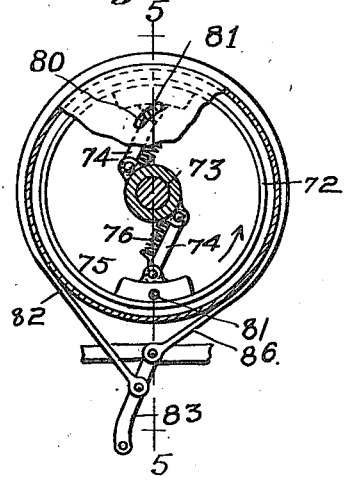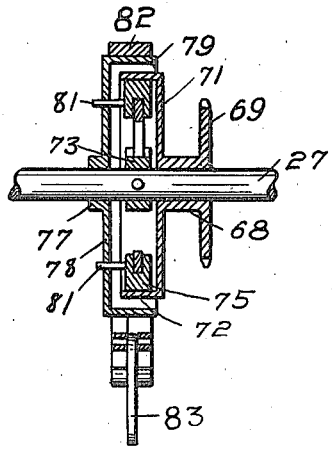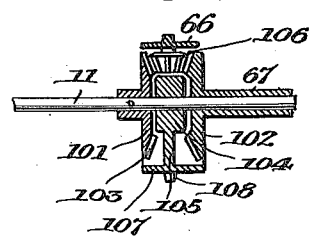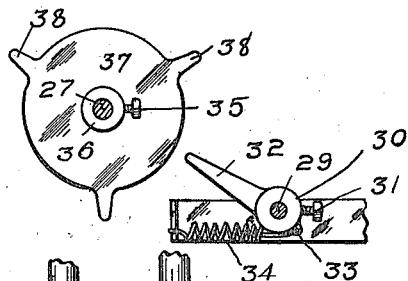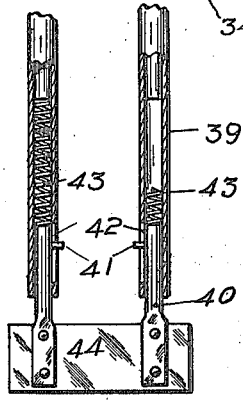

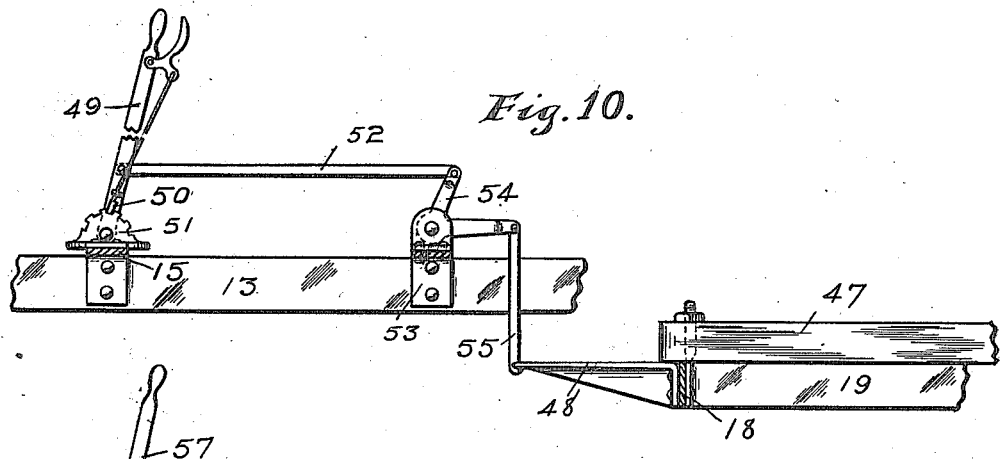
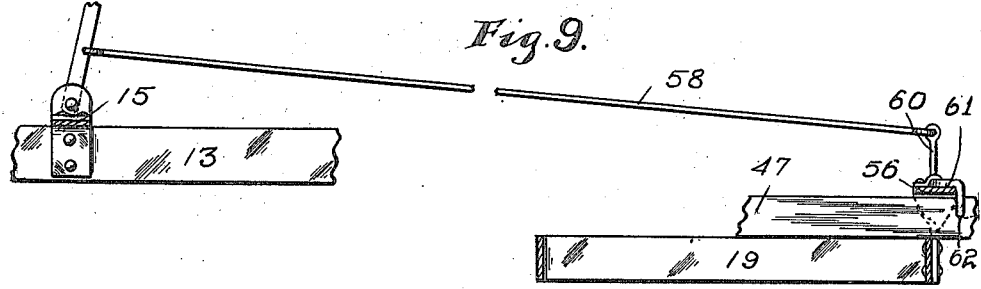
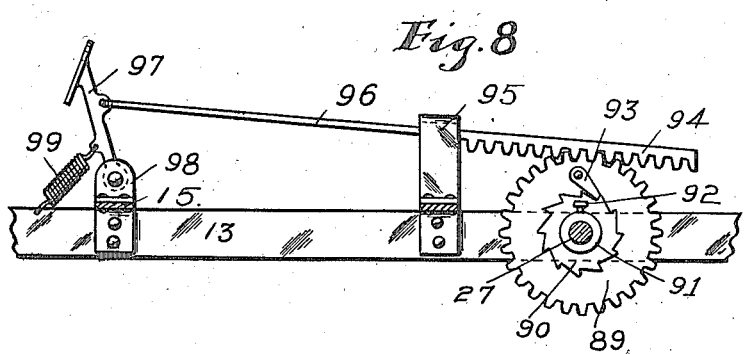

UNITED STATES PATENT OFFICE.

LEE E. EASTER, OF LEON, IOWA.

WIRELESS CORN-PLANTER.

1,153,426.     Specification of Letters Patent.     Patented Sept. 14, 1915.

Application filed January 7, 1913. Serial No. 740,666.

*To all whom it may concern:*

Be it known that I, LEE E. EASTER, a citizen of the United States, residing at Leon, in the county of Decatur and State of Iowa, have invented a new and useful Wireless Corn-Planter, of which the following is a specification.

The object of my invention is to provide a wireless corn planter having parts constructed and arranged for dropping corn at regular intervals, and having parts for marking the next rows to be planted so that the corn may be planted in regular rows, so that it may be plowed in both directions.

A further object is to provide such a planter in which the marking devices are so connected with the driving wheels that the marker may be steadily operated in such a manner as to be free from irregularities in its movement which would ordinarily result from the fact that the drive wheels travel at times at slightly different rates of speed and also travel a different number of revolutions in covering a certain distance, due to the fact that the ground is uneven.

A further object is to provide a corn planter of the class mentioned provided with a marker operated from the drive wheels and provided with mechanism for disconnecting the drive wheels and the markers, and also with mechanism for manually moving the markers independently of the movement of the drive wheels.

A further object is to provide such a corn planter in which the tongue and the planter shoes are so mounted on the main frame of the machine as to permit their pivotal movement with relation to said frame.

A further object is to provide such a machine having marker arms and marker blades so mounted thereon as to permit radial movement of blades with relation to the marker arms.

My invention consists in certain details, in the construction, arrangement and combination of the various parts of my device, whereby the objects contemplated are attained, as hereinafter more fully set forth, pointed out in my claims, and illustrated in the accompanying drawings, in which—

Figure 1 shows a top or plan elevation of the corn planter embodying my invention. Fig. 2 shows a side elevation of the same. Fig. 3 shows a detail view of part of the mechanism for connecting the shaft which carries the marker arms with the drive wheels and for disconnecting said shaft and the drive wheels taken on the line 3—3 of Fig. 1. Fig. 4 shows a detail sectional view of the part of the mechanism for connecting the marker carrying shaft with the drive wheels. Fig. 5 shows a transverse vertical sectional view through the parts of the mechanism shown in Fig. 4 taken on line 5—5 of Fig. 4. Fig. 6 shows a detail view of part of the means by which the corn dropper mechanism is actuated from the shaft which carries the marker arms, taken on the line 6—6 of Fig. 1. Fig. 7 shows a detail sectional view of the marker arms and the marker blade. Fig. 8 shows a detail view of the mechanism for advancing the marker shaft with relation to the drive wheels, taken on the line 8—8 of Fig. 1. Fig. 9 shows a detail view of the mechanism by which the tongue and planter shoes are locked against pivotal movement with relation to the main frame of the machine, taken on the line 9—9 of Fig. 1. Fig. 10 shows a detail view of the means for raising or lowering the machine, taken on the line 10—10 of Fig. 1. Fig. 11 shows a detail, sectional view of the differential.

In the accompanying drawings, I have used the reference numeral 10 to indicate generally the wheels on which my improved planter is mounted. The wheels 10 are rotatably mounted on and connected by the transverse shaft 11. Mounted on the transverse shaft 11 is seat 12. Mounted on the shaft 11 is a frame which is so arranged as to permit its tilting, which frame includes spaced longitudinal members 13, a rear cross member 14, and intermediate cross members 15 and 16. The members 13 extend forward beyond the front cross member 16. In front of the last described frame in the machine is a substantially rectangular frame comprising the transverse members 17 and 18 and the end members 19. The last named frame is also provided with intermediate cross members 20 arranged in pairs. The members 19 and 20 are provided with upward extensions or brackets 22. The forward ends of the members 13 are pivoted at 23 and 24 to the upward extensions 22. Mounted on the outer ends of the axle or shaft 11 are arms 24$^a$ which extend forwardly into the machine and are pivoted to the outer upwardly extending members 22 at 25 at points in the vertical, transverse plane of the pivotal points 23 and 24. It will therefore be seen that the second frame is capable of pivotal or tilting movement with relation to the first frame. Rotatably mounted in suitable bearings 26 on the second frame is a transverse shaft 27 in front of the planter wheels 10. Mounted on the second frame at each end thereof is a planter box 28 provided with usual dropping mechanism designed to be operated from a transverse shaft 29. On the shaft 29 is adjustably mounted a collar 30 by means of set screw 31. Extending rearwardly and upwardly from the collar 30 is a finger 32. For holding the finger 32 at the upper limit of its movement I have secured to a lug 33 on the collar 30 and preferably to the frame member 18 a contractible coil spring 34 shown in Fig. 6. Adjustably mounted on the shaft 27 by means of a set screw 35 is a collar 36 fixed on which is disk 37 having outwardly extending fingers 38 also shown in Fig. 6. The mechanism just described is designed for the purpose of intermittently moving the shaft 29, for operating the dropper mechanism in unison with the movement of the shaft 27 and the markers which will hereinafter be described.

On each outer end of the shaft 27 are pairs of marker arms 39 extending at right angles from shaft 27, said pairs being arranged at equal distances from each other as shown in Fig. 2. Telescopically mounted on the outer ends of each marker arm is an arm 40, the movement of which with relation to the marker arm 39 is limited by means of a pin 41 which travels in a longitudinal slot 42 in the arm 39. For holding the arms 40 at the outward limit of their movement with relation to the arm 39, I have provided expansible coil springs 43. Secured to the outer ends of the arms 40 are marker blades 44. I preferably connect the adjacent pairs of arms 39 by means of brace rods 45. Pivotally mounted on the rearward frame member 18 is a tongue 47 which is mounted to swing in a substantially horizontal plane. Extending rearwardly from the frame member 18 is an arm 48.

For tilting the second frame with relation to the first frame, I provide the following means: Mounted preferably on the cross member 15 is a lever 49 provided with the usual pawl 50 designed to coact with notches in the sector 51. Pivoted to the lever 49 is a forwardly extending link 52. Centrally pivoted, preferably on a bracket 53 mounted on a transverse member 16 is a bell crank lever 54, one arm of which is pivoted to the forward end of the link 52. The other arm of the bell crank lever 54 is pivoted to one end of a link 55, the other end of which is pivoted to the rearwardly extending arm 48. It will therefore be seen that by means of the mechanism last described the tongue can be raised or lowered and the second frame can be tilted with relation to the first frame. Mounted on the frame member 17 is an upwardly extending guide device 56 having substantially the form of an inverted U. The tongue 47 slides between the upper portion of the guide device 56 and the frame member 17 and the pivotal movement of the tongue 47 is limited by the sides of the guide device 56.

For locking the tongue against pivotal movement I have provided the following means: Mounted preferably on the frame member 15 is a lever 57 pivoted to which is a forwardly extending link 58. Rotatably mounted on suitable bearings on the upper portion of the guide 56 is a rod 59 having an upward extension 60 pivoted to the forward end of the link 58, having also a forward extension 61 having on its forward end a downward extension 62 which in one position of the rotation of the rod 59 is received in a slot 63 in the upper surface of the tongue 47, thereby locking the tongue against pivotal movement with relation to the planter. The planter shoes 64 are also pivotally mounted with relation to the frame of the machine. At the rear ends the planter shoes are pivotally and telescopically connected with the dropper chutes 65 as shown in Fig. 2. At the forward upper ends the planter shoes 64 are pivoted to the transverse bar 65ª which is pivoted at its center to the tongue 47. It will therefore be seen that when the forward end of the tongue is swung laterally the forward ends of the planter shoes will swing laterally in unison with the tongue as shown by the dotted lines in Fig. 1. The advantages of this construction in connection with a planter to which my device belongs will be hereinafter more fully explained.

For operating the shaft 27 from the shaft 11 and thereby operating the marker arms and the grain dropper mechanism, I have provided the following means: On the shaft 11 is a differential 66 one member 101 of which is operatively connected with the shaft 11. Another member 102 is secured to the sleeve 67. The members 102 and 101 are provided near their outer edges with adjacent beveled gear teeth 103. Loosely mounted on the shaft 11, between the members 101 and 102 is a differentiating member, comprising a sleeve 104 and short shafts 105, on which are mounted beveled gears 106 in mesh with both members 101 and 102. Mounted on the outer ends of the shafts 105 is an annular plate 107, on which are formed sprocket teeth 108. Mounted on one end of the shaft 11 is a sleeve 67 secured to one of the wheels 10 and operatively connected with the other side of the differential 66. Suitably mounted on the second frame in line with the pivotal points 24 and 25 is a shaft 20ª on which are sprocket gears 21ª and 23ª.

On the shaft 27 is a sleeve 68 on which is a sprocket 69. The differentiating member of the differential is provided with sprocket teeth 108 and a sprocket chain 70 travels on said gear and on the sprocket gear 23ª. On the shaft 27 is a sleeve 68 on which is a sprocket 69. A sprocket chain 22ª travels on the sprockets 69 and 21ª. This construction is necessary on account of the fact that the shaft 27 tilts with the second frame. Formed on the sleeve 68 is an annular disk 71 having at its outer circumference a circumferential annular flange 72. Fixed on the shaft 27 adjacent to the disk 71 is a collar 73. Pivoted to the collar 73 are outwardly extending links 74. Pivoted at the outer ends of said links are friction shoes 75 designed in certain positions of their movement to engage the inner surface of the flange 72. For holding the shoes 75 at the outer limit of their movement in frictional engagements with the flange 72, I have provided expansible coil springs 76. Rotatably but non-slidably mounted on the shaft 27 near the collar 73 is a collar 77 formed on which is an annular disk 78 at the outer edge of which is a circumferential annular flange 79. Formed in the disk 78 are two curved elongated slots 80 in which are received pins 81 extending laterally from the shoes 75. On the flange 79 is a band brake 82 the ends of which are pivoted at points spaced apart from each other to the lever 83. One end of the lever 83 is pivoted to a link 84 which is operated by means of a foot lever 85. For holding foot lever 85 in such position that the band brake is inoperative, I have provided an expansible coil spring 86 secured to said lever and to the frame of the machine. When the machine is driven forward the flange 72 travels in the direction indicated by the arrow in Fig. 4 and through the shoes 75, the link 74, and the collar 73 rotates the shaft 27. If it is desired to hold the shaft 27 against rotation while the machine advances a short distance the foot lever 85 is moved to lock the band brake 82. Ordinarily the flange 79 travels with the flange 72 on account of the pins 81. When however the flange 79 is gripped by the band brake the tendency is to stop the disk 78 thereby drawing the pins 81 inwardly and moving the shoes 75 inwardly from frictional engagement with the flange 72.

It will be understood that with a frictional clutch device of the class just described, the variations of the pressure upon the foot lever 85 will cause a variation in the effect upon the band brake 82. For instance, if a very slight tension is imposed upon the band brake, the band brake will not be locked but will exercise sufficient frictional engagement on the flange 79 to tend to retard the disk 78. The pins 81 will move inwardly very slightly and the frictional engagement of the shoes 75 with the flange 72 will be reduced so that the flange 72 will slide with relation to said shoes. If the tension on the band brake is slight, the rotation of the shaft 27 will not be entirely stopped but only retarded. If the tension on the band brake is increased it will readily be seen that the movement of the disk 78 will be stopped and the shaft 27 will thereby be entirely disconnected from the sprocket 69.

In the practical operation of my improved wireless corn planter, assuming the parts to be in their normal position the machine is drawn forward by a team of horses or other suitable motive power applied to the tongue 47. If the forward end of the tongue 49 is supported at a certain height the rearward end thereof may be raised or lowered as desired by means of the lever 49 and the mechanism connected therewith. By same means the second frame may be tilted as desired with relation to the first frame. If the operator so wishes, lever 57 may be moved to proper position for causing the extension 62 to enter the slot 63, thereby locking the tongue 47 against pivotal movement. The shaft 27 is rotated from the shaft 11 through the mechanism hereinbefore described in detail. The grain dropping mechanism is operated from the shaft 29 which in turn is actuated from the shaft 27 by means of the mechanism hereinbefore described. The parts are so arranged that the grain is dropped just as the marker blade 44 has struck the ground so that the hills will be planted in line with marks made by the blades 44. The distance between the successive blades 44 on the circumference of a circle having its center at the middle of the shaft 27 is the proper distance between the hills. If for any reason the marker blades 44 should not strike the ground soon enough to keep the row of hills even across the field, the marker arms may be advanced with relation to the wheels 10 by means of the mechanism that I will now describe. Mounted on the shaft 27 is a toothed gear wheel 89 which is rotatably but nonslidably mounted on said shaft. Fixed on the shaft 27 adjacent to the gear wheel 89 is a ratchet wheel 90 formed on the collar 91 which is adjustably held in position on the shaft by means of the set screw 92. Pivoted to the gear wheel 89 above the ratchet wheel 90 is a swinging pawl 93. I provide a rack bar 94 preferably above the gear 89 and provided with teeth in mesh with the teeth of the gear wheel 89 which rack bar is mounted in a suitable guide 95. Secured to the rack bar is a rearwardly extending rod 96 which is pivoted at its rearward end to a foot lever 97. The foot lever 97 is pivotally mounted in a bracket 98 which may be mounted on the cross member 15 of the frame. For yieldingly holding the foot lever 97 at the rearward position of its movement, I have secured to said lever and to the frame of the machine a contractible coil spring 99. When it is desired to advance the marking devices more rapidly than they would be advanced by the other mechanism hereinbefore described, lever 97 may be moved forward. Rack bar 94 will then rotate the gear 89, which through the pawl 93 and the ratchet 90 will rotate the shaft 27 more rapidly than would otherwise be the case. Should the operator desire to retard the movement of the marking devices in order to cause the marker blades 44 to strike the ground at the proper place the lever 85 may be pressed forwardly, thereby locking the band brake 82. Band brake 82 retards the movement of the flange 79 and the disk 78 and as result the pins 81 are drawn inwardly toward the shaft 27 and the shoes 75 are drawn out of engagement with the flange 72, more or less completely depending upon the tension imposed upon the band brake. The rotation of the shaft 27 will then be retarded with relation to the rotation of the sprocket 69 or entirely stopped as the case may be.

In wireless grain planters of the class to which my invention belongs, where the marker devices are operated from the planter wheels, difficulty is experienced in keeping the rows even on account of the fact that unevenness in the ground causes the wheels to run at times at unequal speeds. To overcome this difficulty I have employed the differential gear 66 whereby unevenness in the travel of the wheels is equalized. In many planters of the general type to which my machine belongs the markers are operated by friction with the ground and if the ground is uneven the markers do not necessarily travel at the same rate of speed as the planter wheels and the rows of hills of grain are constantly uneven. This difficulty is largely avoided by driving the shaft which carries the marker arms and actuates the grain dropping mechanism from the planter wheels. In a planter of this class in which the marker devices are operated from the planter wheels it is necessary to provide some means whereby the markers may be advanced. Should they for any reason be touching the ground behind the proper point for this purpose I have provided the pawl and ratchet devices hereinbefore described. It may be noted in this connection that such device is made practical by the fact when the shaft 27 is rotated by means of the pawl and ratchet, devices connected with the lever 97, the shoes 75 and the member connected therewith are so arranged as to permit said shaft to rotate. Another difficulty ordinarily experienced with devices of this general class results from the fact that the horses do not travel evenly and consequently jerk the forward end of the tongue from side to side. Where the tongue is fixed solidly to the frame of the planter this "weaving" of the horses results in jerking the marker arms laterally and tends to throw the marks to some extent out of line. The same unevenness in the travel of the horses jerks the planter shoes from side to side and causes the hills to be planted in an uneven line. These difficulties I have avoided by pivotally mounting the tongue and the planter shoes so that their respective forward ends may be swung laterally with the minimum lateral movement of the marker arms and of the rear ends of the planter shoes. I consider this feature of my invention of considerable importance. The shaft 27 is mounted on the second frame so that it may tilt with the planter shoes 64. If the shaft were mounted on the first frame the tilting of the frames with relation to each other might cause a slight variation in the distance between the hills without correspondingly affecting the marker arms and consequently varying the distance between the marks.

I claim as my invention:

1. In a corn planter, a frame mounted on wheels, a second frame pivotally mounted on said first frame, planter shoes mounted on said second frame, a shaft mounted on said second frame in the vertical and horizontal planes of the pivotal points of said frames, means whereby rotary movement may be transmitted from said wheels to said shaft, a second shaft mounted on said second frame, marking devices thereon, means for transmitting motion from said first shaft to said second shaft.

2. In a device of the class described, a corn planter frame, an axle thereon, a sleeve on said axle, drive wheels mounted on said axle and sleeve respectively, a second frame pivotally mounted with relation to said first frame, a marker shaft mounted on said second frame, means for transmitting rotary motion from said wheels to said marker shaft, said means comprising a differential gear having members secured to said axle and said sleeve respectively and having a differentiating member provided with sprocket teeth, a short shaft mounted on said second frame, in the vertical and horizontal transverse planes of the pivotal points of said frames, sprocket wheels on said short shaft fixed with relation to each other, a sprocket chain operatively mounted on the sprocket teeth on said differentiating member and on one of the sprocket wheels on said short shaft, a sprocket wheel mounted on said marker shaft and a sprocket chain mounted on said last named sprocket wheel and on the other of the sprocket wheels on the short shaft.

3. In a device of the class described, a frame, an axle rotatably mounted thereon, a sleeve rotatably mounted on said axle, drive wheels fixed on said axle and said sleeve respectively, a second frame pivotally mounted on said first frame, a marker shaft rotatably mounted on the second frame, and means for transmitting rotary motion from said wheels to said marker shaft, said means comprising a differential having members fixed respectively to the axle and the sleeve and having a differentiating member, a short shaft mounted on said second frame in the vertical and horizontal transverse planes of the pivotal points of said frames, gearing devices operatively connecting said differentiating member with said short shaft, and gearing devices operatively connecting said short shaft and said marker shaft.

Des Moines, Ia., Dec. 20, 1912.

LEE E. EASTER.

Witnesses:
M. WALLACE,
L. ROBINSON.